US009778716B2

United States Patent
Jimbo (10) Patent No.: US 9,778,716 B2
(45) Date of Patent: Oct. 3, 2017

(54) PRINTER AND CONTROL CIRCUIT FOR POWERING A CASH DRAWER OF A POINT-OF-SALE SYSTEM

(71) Applicant: Seiko Instruments Inc., Chiba-shi, Chiba (JP)

(72) Inventor: Seiichi Jimbo, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 15/006,499

(22) Filed: Jan. 26, 2016

(65) Prior Publication Data

US 2016/0224084 A1    Aug. 4, 2016

(30) Foreign Application Priority Data

Jan. 30, 2015  (JP) .................................. 2015-017470

(51) Int. Cl.
| | |
|---|---|
| *G06F 1/00* | (2006.01) |
| *G06F 1/26* | (2006.01) |
| *G06Q 20/00* | (2012.01) |
| *G06F 1/32* | (2006.01) |
| *B41J 29/393* | (2006.01) |
| *G07G 5/00* | (2006.01) |
| *G06Q 20/20* | (2012.01) |
| *G07G 1/12* | (2006.01) |

(52) U.S. Cl.
CPC ............ *G06F 1/266* (2013.01); *B41J 29/393* (2013.01); *G06F 1/3284* (2013.01); *G07G 5/00* (2013.01); *G06F 1/26* (2013.01); *G06Q 20/20* (2013.01); *G07G 1/12* (2013.01)

(58) Field of Classification Search
USPC ........................... 713/310, 300, 330; 705/16
See application file for complete search history.

(56) References Cited

U.S. PATENT DOCUMENTS

| | | | | |
|---|---|---|---|---|
| 6,061,224 A | * | 5/2000 | Allen ..................... | H01F 7/1811 361/115 |
| 6,198,985 B1 | * | 3/2001 | Miyasaka ............... | G06F 3/121 358/1.15 |
| 9,411,369 B2 | * | 8/2016 | Schneider ............. | G06F 1/1632 |
| 2010/0171627 A1 | * | 7/2010 | Takizawa ............. | G07G 1/0027 340/665 |
| 2013/0246198 A1 | * | 9/2013 | Truong ................ | G07G 1/0009 705/16 |
| 2014/0088760 A1 | * | 3/2014 | Truong ................ | G07G 1/0009 700/244 |

(Continued)

FOREIGN PATENT DOCUMENTS

JP        2011-209850 A     10/2011

*Primary Examiner* — Ji H Bae
(74) *Attorney, Agent, or Firm* — Brinks Gilson & Lione (57) ABSTRACT

A printer connected to an external host device and a peripheral device, the printer comprising: a power generation circuit configured to supply a preset drive voltage required for an operation of the peripheral device to the peripheral; a drive circuit configured to operate the peripheral device with the drive voltage in response to input of a drive signal; a control circuit configured to output the drive signal to the drive circuit to operate the drive circuit only in a preset drive period during which the drive circuit operates; and a communication circuit connected to the control circuit and configured to receive data input from the external host device.

8 Claims, 5 Drawing Sheets

(56) References Cited

U.S. PATENT DOCUMENTS

2014/0223037 A1\* 8/2014 Minoo ................. G06F 1/1632
710/16
2015/0303683 A1\* 10/2015 Barnette ................ H02H 9/025
361/93.9

\* cited by examiner

PRINTER AND CONTROL CIRCUIT FOR POWERING A CASH DRAWER OF A POINT-OF-SALE SYSTEM

RELATED APPLICATIONS

This application claims priority under 35 U.S.C. §119 to Japanese Patent Application No. 2015-017470 filed on Jan. 30, 2015, the entire content of which is hereby incorporated by reference.

BACKGROUND OF THE INVENTION

1. Field of the Invention

The present invention relates to a printer and a control circuit.

2. Description of the Related Art

A POS system capable of managing point of sale (POS) is known as a device that inputs sales, performs deposit and withdrawal of money, and issues a receipt in a store. The POS system includes a POS terminal, a printer, and a peripheral device such as a cash drawer.

Conventionally, a printer connected to a cash drawer has been known. In a typical POS system, a power for the printer is also supplied as a power for the cash drawer. However, a drive voltage of the printer is not necessarily equal to a drive voltage of the cash drawer. In this case, it is necessary to generate the power for the cash drawer inside the printer.

However, a drive time of the cash drawer is extremely short in a time during which the POS system operates. Thus, continuously generating the power for the cash drawer inside the printer considerably reduces the power efficiency.

Thus, the printer may have a configuration that includes a power generation circuit which supplies power to the cash drawer in response to input of a power generation signal, a drive circuit which drives the cash drawer in response to input of a drive signal, and a printer controller which outputs the power generation signal and the drive signal. In order to improve the power efficiency of the printer, such a configuration may employ a method that generates the power for the cash drawer only when the cash drawer is driven. However, in a conventional printer, when the cash drawer is driven simultaneously with the power generation, since the power generation circuit has not yet come up, a preset drive period of the cash drawer may be finished without obtaining a sufficient electric power as an output, which may cause a problem in which the cash drawer cannot be driven.

When the cash drawer that has been used is replaced with a cash drawer of another model, a drive voltage supplied to the cash drawer may differ from the drive voltage before the replacement. In order to cope with this situation, the printer controller may output a voltage designation signal to the power generation circuit to generate a required drive voltage. However, the rise time of the power generation circuit differs between the cash drawers due to the difference in drive voltage, which may cause a problem as described above in which the cash drawer cannot be driven due to the finish of the preset drive period of the cash drawer.

Further, there has been conventionally known a method in which a constant current circuit is provided in a drive circuit inside the printer to drive cash drawers having different drive voltages. However, in such a method, a current is restricted. Thus, an electric power required for the cash drawer cannot be obtained, and the cash drawer cannot be driven with the required drive voltage.

In view of the above, a printer and a control circuit having a high power efficiency have been desired in the art.

SUMMARY OF THE INVENTION

A printer according to one aspect of the present invention is connected to an external host device and a peripheral device. The printer comprises: a power generation circuit configured to supply a preset drive voltage required for an operation of the peripheral device to the peripheral; a drive circuit configured to operate the peripheral device with the drive voltage in response to input of a drive signal; a control circuit configured to output the drive signal to the drive circuit to operate the drive circuit only in a preset drive period during which the drive circuit operates; and a communication circuit connected to the control circuit and configured to receive data input from the external host device.

In the printer according to one aspect of the present invention, the control circuit determines the drive voltage generated by the power generation circuit in response to input of a start instruction for starting an operation of the peripheral device from the external host device and outputs a voltage designation signal indicating the drive voltage to the power generation circuit. The control circuit determines a preset rise time that elapses before a supply voltage supplied to the peripheral device becomes the drive voltage from an initial value, outputs a power generation signal to the power generation circuit, and controls the power generation circuit to start supply of the supply voltage to the peripheral device. The control circuit measures a time that elapses before the supply voltage becomes the drive voltage and outputs the drive signal to the drive circuit at start timing of the drive period when the measured time becomes the rise time. The control circuit stops output of the voltage designation signal, the power generation signal, and the drive signal at finish timing of the drive period.

The printer according to one aspect of the present invention, wherein the drive period, the start instruction, the drive voltage determined by the control circuit, and the rise time are input to the control circuit through the communication circuit.

The printer according to one aspect of the present invention, further comprises a nonvolatile memory connected to the control circuit, wherein the drive period and the start instruction are input to the control circuit through the communication circuit, and the drive voltage determined by the control circuit and the rise time are previously stored in the nonvolatile memory.

The printer according to one aspect of the present invention, further comprises a nonvolatile memory connected to the control circuit, wherein the start instruction is input to the control circuit through the communication circuit, and the drive voltage determined by the control circuit, the rise time, and the drive period are previously stored in the nonvolatile memory.

The printer according to one aspect of the present invention, further comprises a nonvolatile memory connected to the control circuit, wherein the drive period, the start instruction, and a model name of the peripheral device are input to the control circuit through the communication circuit, and a plurality of drive voltages determined by the control circuit and a plurality of rise times are previously stored in the nonvolatile memory corresponding to model names of the peripheral device.

The printer according to one aspect of the present invention, further comprises a nonvolatile memory connected to the control circuit, wherein the start instruction and a model name of the peripheral device are input to the control circuit through the communication circuit, and a plurality of drive voltages determined by the control circuit, a plurality of rise times, and a plurality of driving periods are previously stored in the nonvolatile memory corresponding to model names of the peripheral device.

A control circuit according to one aspect of the present invention is a control circuit for a printer connected to an external host device and a peripheral device, the printer comprising: a power generation circuit configured to supply a drive voltage required for an operation of the peripheral device to the peripheral device; a drive circuit configured to operate the peripheral device with the drive voltage in response to input of a drive signal; and a communication circuit connected to the control circuit and configured to receive data input from the external host device. The control circuit outputs the drive signal to the drive circuit to operate the drive circuit only in a drive period during which the drive circuit operates.

In the printer and the control circuit according to one aspect of the present invention, the power generation circuit supplies the preset drive voltage required for the operation of the peripheral device (for example, a cash drawer) to the peripheral device. The drive circuit operates the peripheral device with the drive voltage in response to input of a drive signal. The control circuit outputs the drive signal to the drive circuit to perform control for operating the drive circuit only in the preset drive period during which the drive circuit operates. Accordingly, the power generation circuit supplies the drive voltage to the peripheral device in the preset drive period of the peripheral device, which eliminates the problem in which the peripheral device cannot be driven.

Further, in the printer and the control circuit according to one aspect of the present invention, the power for driving the peripheral device is generated and supplied only when the peripheral device is driven. Thus, it is possible to improve the power efficiency.

DETAILED DESCRIPTION OF THE PREFERRED EMBODIMENTS

Hereinbelow, an embodiment of the present invention will be described with reference to the drawings.

Figure 1:
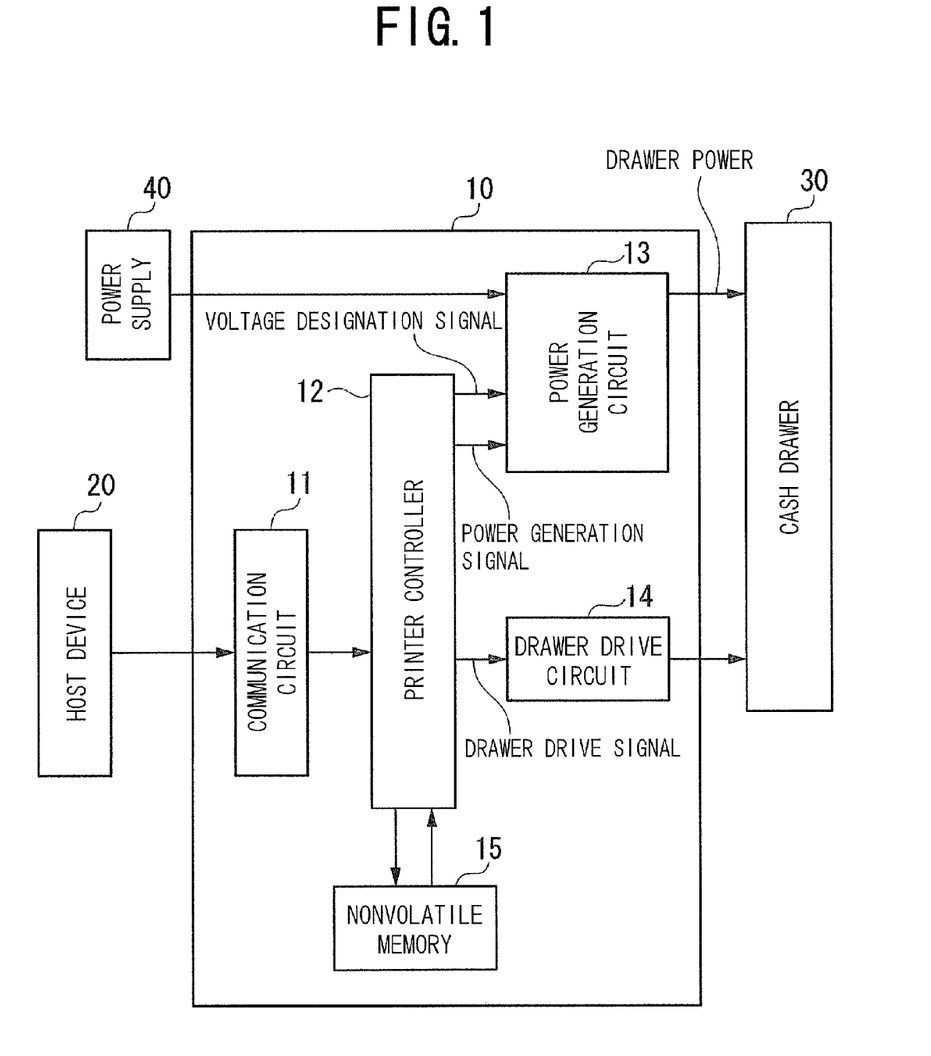
FIG. 1 is a block diagram illustrating the configuration of a printer in an embodiment.

FIG. 1 is a block diagram illustrating the configuration of a printer in the present embodiment. As illustrated in FIG. 1, the printer 10 is provided with a communication circuit 11, a printer controller 12 (control circuit), a power generation circuit 13, a drawer drive circuit 14, and a nonvolatile memory 15.

The communication circuit 11 is connected to a host device 20 (POS terminal) which is located outside the printer 10. The host device 20 includes an input key for inputting a product name or a price and an operation key for performing various settings for a POS system. The host device 20 transmits a control command for instructing the printer 10 to issue a receipt and to open and close a cash drawer 30 (peripheral device) to the communication circuit 11 of the printer 10. The communication circuit 11 receives data input from the host device 20 and transmits the control command included in the data input to the printer controller 12.

The printer controller 12 controls each unit of the printer 10 in response to the control command which is included in the data input from the host device 20 received by the communication circuit 11. For example, the printer controller 12 controls a print unit (not illustrated in FIG. 1) to print contents of print data on a print sheet such as a receipt. The printer controller 12 outputs a control command (a voltage designation signal, a power generation signal, and a drawer drive signal) for supplying a voltage for driving the cash drawer 30 to the power generation circuit 13 and the drawer drive circuit 14 in response to a control command (start instruction) for opening and closing a drawer tray of the cash drawer 30, the control command being received by the communication circuit 11 from the host device 20.

Figure 2:
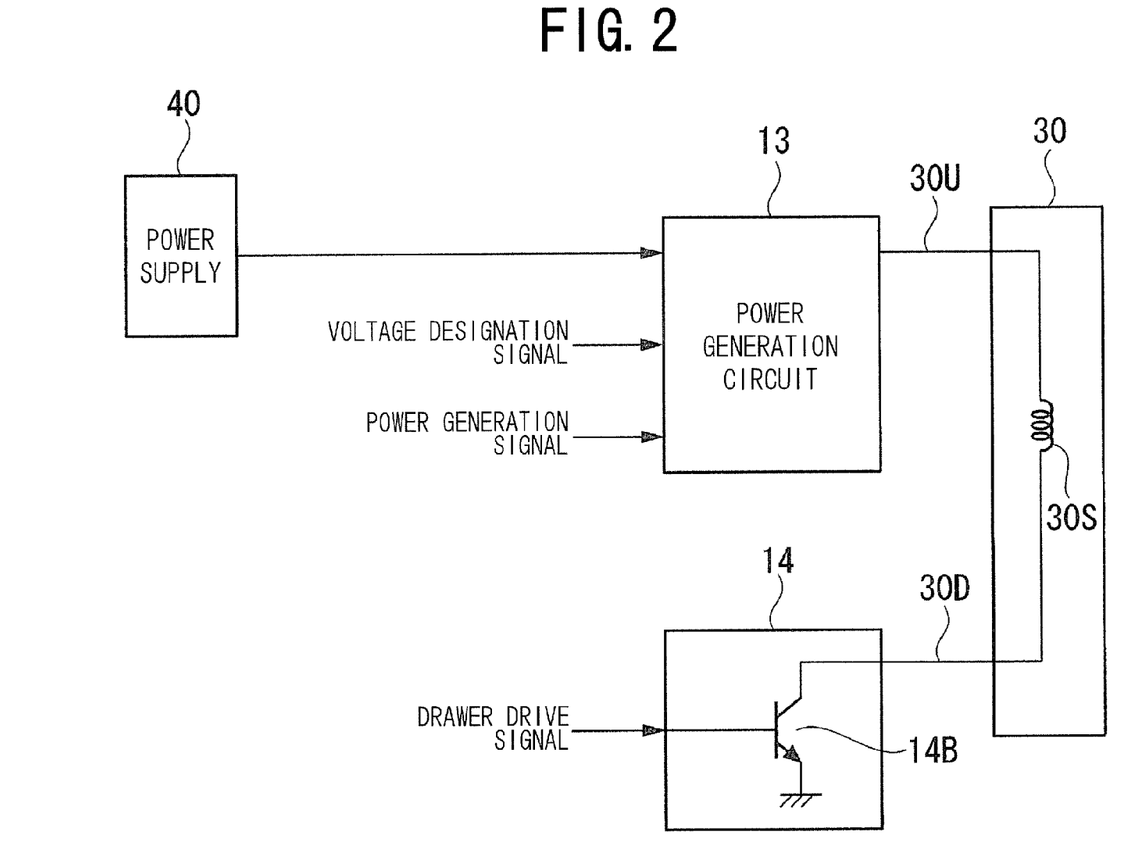
FIG. 2 is a diagram illustrating a connection relationship between a power generation circuit, a cash drawer, and a drawer drive circuit.

A connection relationship between the power generation circuit 13, the cash drawer 30, and the drawer drive circuit 14 will be described with reference to FIG. 2. FIG. 2 is a diagram illustrating the connection relationship between the power generation circuit 13, the cash drawer 30, and the drawer drive circuit 14. A voltage supplied from a power supply 40, and a voltage designation signal and a power generation signal from the printer controller 12 are input to an input terminal of the power generation circuit 13. An output terminal of the power generation circuit 13 is connected to a first end of a solenoid coil 30S of the cash drawer 30 through a connection cable 30U. The power generation circuit 13 converts the voltage supplied from the power supply 40 and outputs a drawer power (supply voltage) which is the converted voltage from the output terminal so as to be supplied to the first end of the solenoid coil 30S through the connection cable 30U.

A transistor 14B of the drawer drive circuit 14 is, for example, a bipolar transistor. A collector terminal (output terminal) of the transistor 14B is connected to a second end of the solenoid coil 30S of the cash drawer 30 through a connection cable 30D. A drawer drive signal (drive signal) from the printer controller 12 is input to a base terminal (input terminal) of the transistor 14B. An emitter terminal of the transistor 14B is grounded.

The solenoid coil 30S is an element that constitutes a lock mechanism of the cash drawer 30. When a preset drive voltage required for operation is applied between both terminals, the solenoid coil 30S brings the lock mechanism into an unlock state. On the other hand, when the preset drive voltage required for operation is not applied between the both terminals, the solenoid coil 30S cannot bring the lock mechanism into the unlock state.

Referring back to FIG. 1, the power generation circuit 13 is connected to the power supply 40. The power supply 40 is a main power supply of the printer 10. The power generation circuit 13 converts the voltage supplied from the power supply 40 and outputs the drawer power as the converted voltage from the output terminal so as to be supplied to the first end of the solenoid coil 30S. A target value of the drawer power is the preset drive voltage required for the operation of the cash drawer 30 (hereinbelow, referred to as the drive voltage V1). When a voltage designation signal indicating the drive voltage V1 is input from the printer controller 12, the power generation circuit 13 sets the target value of the drawer power at the drive voltage V1. When a power generation signal is input from the printer controller 12 after the setting of the drive voltage V1, the power generation circuit 13 starts output of the drawer power from the output terminal so that the target value of the drawer power becomes the drive voltage V1.

When the drawer drive signal is input from the printer controller 12, the drawer drive circuit 14 keeps the transistor 14B in an on state to drive the solenoid coil 30S in a period during which the drawer drive signal is input. The period during which the drawer drive signal is input is a drive period of the solenoid coil 30S which is a preset drive period (hereinbelow, referred to as the drive period T0).

In the present embodiment, the nonvolatile memory 15 stores a control method executed by the printer controller 12.

Figure 3:
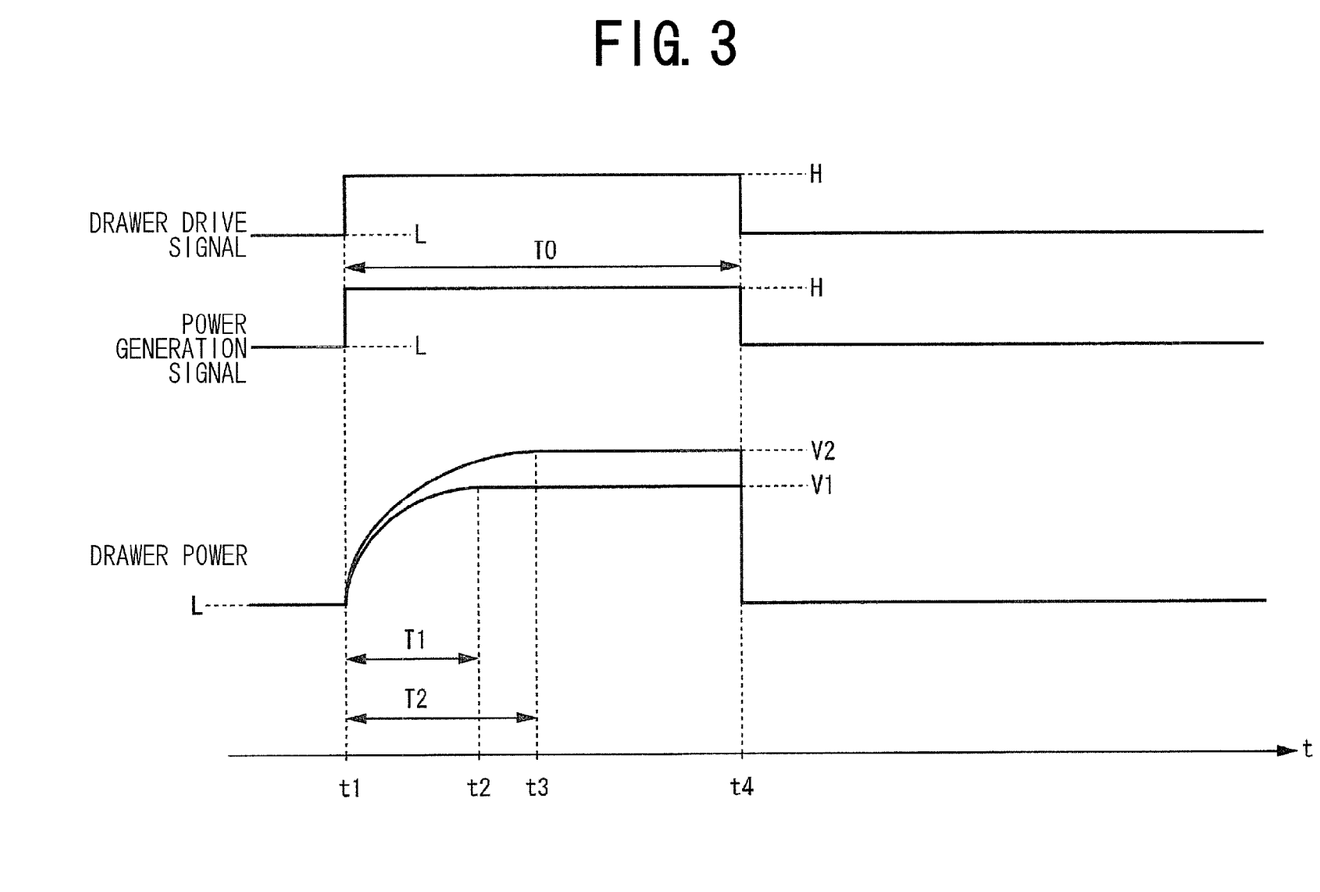
FIG. 3 is a diagram for describing a problem in an operation process in a conventional printer.

As described above, the printer controller 12 outputs the voltage designation signal, the power generation signal, and the drawer drive signal to control the power generation circuit 13 and the drawer drive circuit 14 to thereby control the operation of the cash drawer 30. However, a conventional configuration has a problem as described below. FIG. 3 is a diagram for describing a problem in an operation process of a conventional printer. In FIG. 3, a horizontal axis represents time, and a vertical axis represents level changes in a drawer drive signal, a power generation signal, and a drawer power. At a time t1, the printer controller 12 changes the power generation signal from an L level to an H level to allow the power generation circuit 13 to supply the drawer power to the cash drawer 30.

The printer controller 12 also changes the drawer drive signal from an L level to an H level at the time t1 to drive the cash drawer 30. Accordingly, the transistor 14B of the drawer drive circuit 14 is turned on to apply the drawer power to both the ends of the solenoid coil 30S of the cash drawer 30. However, the drawer power reaches the drive voltage V1 required for the operation of the cash drawer 30 at a time t2. Further, the drawer drive signal returns to the L level at a time t4. Thus, during a time (t2−t1), that is, a rise time T1 in the drive period T0, the drive voltage required for the operation of the cash drawer 30 cannot be obtained. Therefore, disadvantageously, the cash drawer 30 cannot be driven in the drive period T0.

When the cash drawer 30 is replaced with another model, the drive voltage required for the operation of the cash drawer 30 may be changed from the drive voltage V1 to a drive voltage V2. In this case, the drawer power reaches the drive voltage V2 required for the operation of the cash drawer 30 at a time t3. Further, the drawer drive signal returns to the L level at the time t4. Thus, during a time (t3−t1), that is, a rise time T2 in the drive period T0, the drive voltage required for the operation of the cash drawer 30 cannot be obtained. Therefore, disadvantageously, the cash drawer 30 cannot be driven in the drive period T0. In particular, since the drive voltage V2> the drive voltage V1 is satisfied in this case, the proportion of the rise time in the drive period T0 of the drawer power increases (the proportion of a time during which the drawer power is within the drive voltage in the drawer power drive period T0 decreases) as the drive voltage of the replaced model increases.

Thus, in order to solve the above problem to provide a printer having a high power efficiency, the printer controller 12 outputs the voltage designation signal, the power generation signal, and the drawer drive signal to control the power generation circuit 13 and the drawer drive circuit 14 to thereby control the operation of the cash drawer 30 as described below. The printer controller 12 determines the drive voltage generated by the power generation circuit 13 (the drive voltage corresponding to the model of the cash drawer 30 such as the drive voltage V1 and the drive voltage V2) in response to a start instruction for starting the operation of the cash drawer 30, the start instruction being received by the communication circuit 11 from the host device 20. In the present embodiment, the drive voltage is given from the host device 20. The printer controller 12 outputs the voltage designation signal indicating the drive voltage to the power generation circuit 13. When the voltage designation signal indicating the drive voltage is input from the printer controller 12, the power generation circuit 13 sets the target value of the drawer power at the drive voltage.

The printer controller 12 determines a preset rise time that elapses before the drawer power supplied from the power generation circuit 13 to the cash drawer 30 becomes the drive voltage from an initial value (L level) (the rise time corresponding to the model of the cash drawer 30 such as the rise time T1 and the rise time T2 which is previously obtained by, for example, an experiment). In the present embodiment, the rise time is given from the host device 20. The printer controller 12 outputs the power generation signal to the power generation circuit 13. When the power generation signal is input from the printer controller 12 after the setting of the drive voltage, the power generation circuit 13 starts output of the drawer power from the output terminal.

The printer controller 12 measures a time that elapses before the drawer power becomes the drive voltage and outputs the drawer drive signal to the drawer drive circuit 14 at start timing of the drive period T0 when the measured time becomes the rise time. Accordingly, the cash drawer 30 is driven with the drive voltage as the target value of the drawer power in the drive period T0, which eliminates a situation in which the cash drawer 30 cannot be driven. The printer controller 12 stops the output of the voltage designation signal, the power generation signal, and the drawer drive signal at finish timing of the drive period T0. The drive period T0 between the start timing and the finish timing is given from the host device 20.

Figure 4:
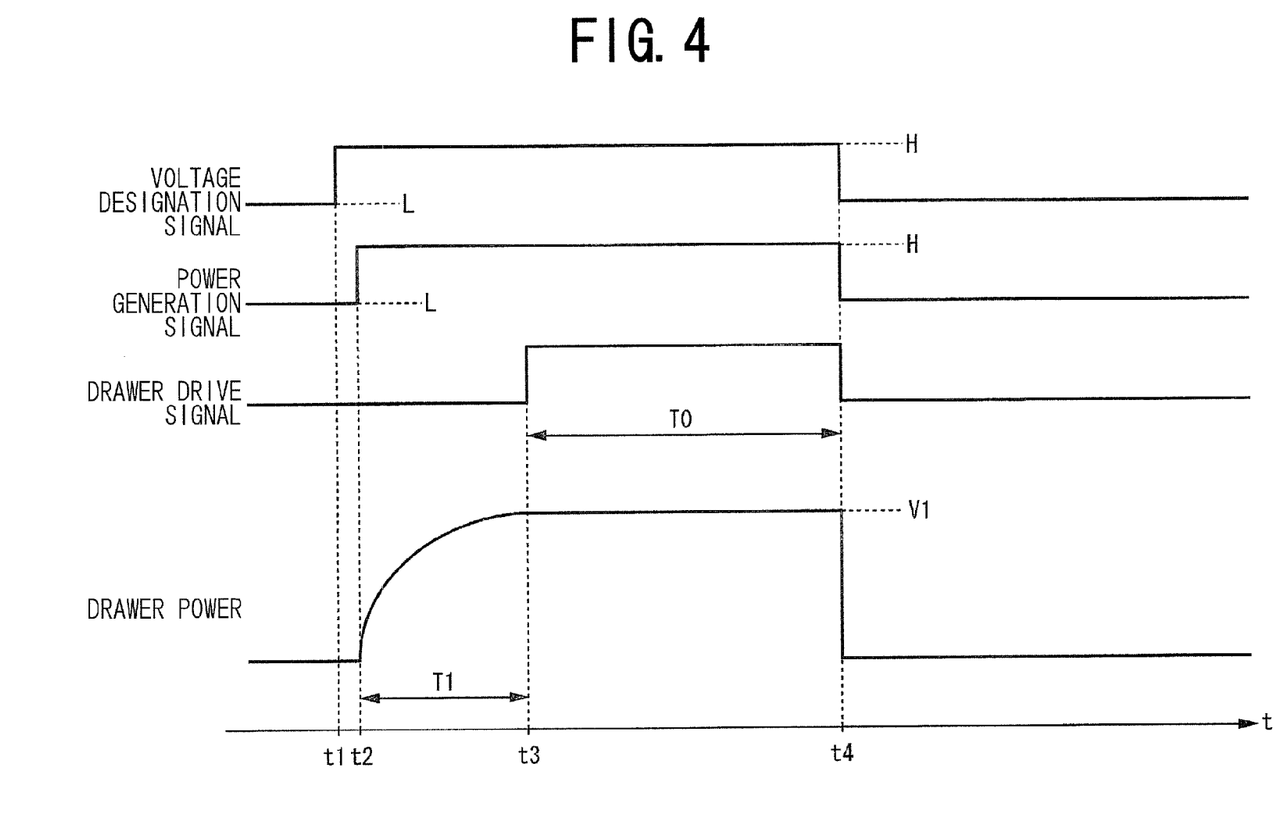
FIG. 4 is a timing chart illustrating a drive operation of the cash drawer in the present embodiment.
Figure 5:
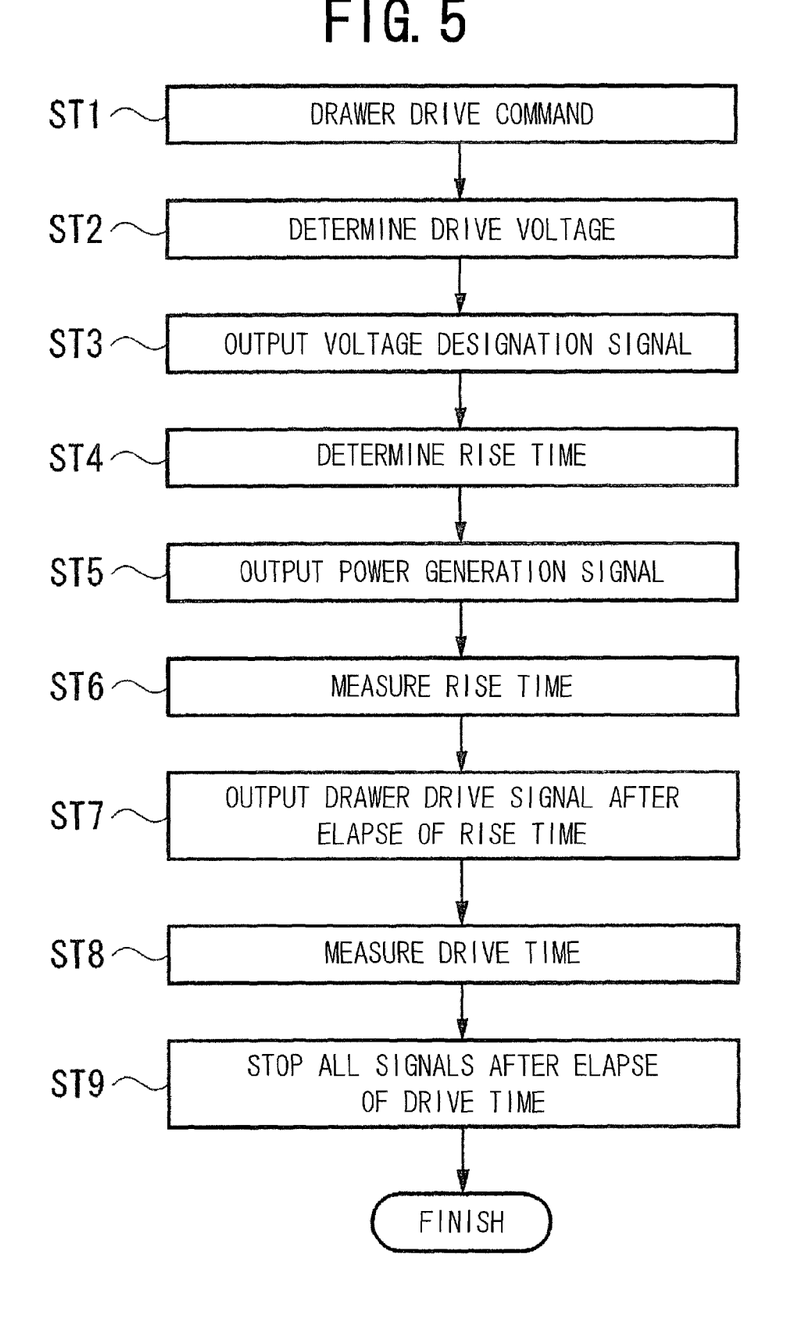
FIG. 5 is a flow chart illustrating the drive operation of the cash drawer in the present embodiment.

Next, the drive operation of the cash drawer 30 will be described with reference to FIGS. 4 and 5. FIG. 4 is a timing chart illustrating the drive operation of the cash drawer in the present embodiment. FIG. 5 is a flow chart illustrating the drive operation of the cash drawer in the present embodiment. In FIG. 4, a horizontal axis represents time, and a vertical axis represents level changes in a voltage designation signal, a drawer drive signal, a power generation signal, and a drawer power. In the present embodiment, a preset drive voltage required for the operation of the cash drawer 30 is referred to as the drive voltage V1, and a rise time of the drawer power is referred to as the rise time T1.

The host device 20 gives a drawer drive command to the printer 10 (step ST1). The printer controller 12 determines the drive voltage (step ST2). Specifically, the printer controller 12 determines the drive voltage V1 generated by the power generation circuit 13 in response to the drawer drive command (a start instruction for starting the operation of the cash drawer 30) received by the communication circuit 11 from the host device 20. In the present embodiment, the drive voltage V1 is given together with the start instruction from the host device 20.

The printer controller 12 outputs the voltage designation signal (step ST3). Specifically, the printer controller 12 outputs the voltage designation signal indicating the drive voltage V1 to the power generation circuit 13 at a time t1 of FIG. 4. When the voltage designation signal indicating the drive voltage V1 is input from the printer controller 12, the power generation circuit 13 sets the target value of the drawer power at the drive voltage V1. The printer controller 12 determines the rise time (step ST4). Specifically, the printer controller 12 determines the preset rise time T1 that elapses before the drawer power supplied from the power generation circuit 13 to the cash drawer 30 becomes the drive voltage from the initial value (L level). In the present embodiment, the rise time T1 is given together with the start instruction from the host device 20.

The printer controller 12 outputs the power generation signal (step ST5). Specifically, the printer controller 12 outputs the power generation signal to the power generation circuit 13 at a time t2 in FIG. 4. When the power generation signal is input from the printer controller 12 after the setting of the drive voltage V1, the power generation circuit 13 starts output of the drawer power from the output terminal. In FIG. 4, the time t1 when the printer controller 12 outputs the voltage designation signal indicating the drive voltage V1 and the time t2 when the printer controller 12 outputs the power generation signal differ from each other. However, the time t1 and the time t2 may be simultaneous with each other. FIG. 4 reflects the current circuit function and merely illustrates that the power generation circuit 13 correctly sets the target value of the drawer power at the drive voltage V1 and thereafter starts the output of the drawer power from the output terminal.

The printer controller 12 measures the rise time (step ST6). Specifically, the printer controller 12 measures the rise time T1 that elapses before the drawer power becomes the drive voltage V1. The printer controller 12 outputs the drawer drive signal after the elapse of the rise time (step ST7). Specifically, at a time t3 in FIG. 4, that is, at the start timing of the drive period T0 when the measured time becomes the rise time T1, the printer controller 12 outputs the drawer drive signal to the drawer drive circuit 14. Accordingly, the preset drive voltage V1 required for the operation of the cash drawer 30 can be supplied to the cash drawer 30 in the drive period T0.

The printer controller 12 measures the drive period (step ST8). The printer controller 12 stops the output of all the signals after the elapse of the drive period (step ST9). Specifically, at the time t4 in FIG. 4, that is, at the finish timing of the drive period T0, the printer controller 12 stops the output of the voltage designation signal, the power generation signal, and the drawer drive signal. Accordingly, the level of the drawer power is the drive voltage V1 in the drive period T0. Thus, it is possible to prevent the rise time T1 from overlapping the drive period T0 as in the conventional configuration.

Next, another embodiment of the present invention will be described with reference to the drawings. In the another embodiment, a nonvolatile memory 15 stores a control method executed by a printer controller 12 in the same manner as in the first embodiment. The nonvolatile memory 15 also stores a preset drive voltage required for the operation of a cash drawer 30 and a rise time of a drawer power differently from the first embodiment. That is, the nonvolatile memory 15 previously stores the drive voltage (V1, V2, . . . VN) and the rise time (T1, T2, . . . TN) corresponding to a model name of the cash drawer 30 (MN1, MN2, . . . MNN). The drive voltage and the rise time are stored in the nonvolatile memory 15 in accordance with an experimental result obtained by performing an experiment in which the printer 10 drives the cash drawer of any model. Instead of the nonvolatile memory 15, the printer controller 12 may have a built-in nonvolatile memory which previously stores the drive voltage and the rise time corresponding to the model name of a peripheral device.

A start instruction for starting the operation of the cash drawer 30, a drive period T0, and a model name MNi (i=1 to N) of the cash drawer are input to the printer controller 12 from a host device 20 through a communication circuit 11. The printer controller 12 reads a drive voltage Vi and a rise time Ti corresponding to the model name MNi of the cash drawer from the nonvolatile memory 15 and determines the read values as the drive voltage Vi and the rise time Ti to control a power generation circuit 13 and a drawer drive circuit 14. A control method at this time is the same as the control method described in the first embodiment. Thus, hereinbelow, the control method will be described with reference to FIGS. 4 and 5 similarly to the first embodiment. In the present embodiment, control corresponding to the model name MN1 of the cash drawer will be described with the drive voltage V1 as the preset drive voltage required for the operation of the cash drawer 30 and the rise time T1 as the rise time of the drawer power.

The printer controller 12 reads the drive voltage V1 corresponding to the model name MN1 of the cash drawer from the nonvolatile memory 15 in response to the drawer drive command (the start instruction for starting the operation of the cash drawer 30) received by the communication circuit 11 from the host device 20 to determine the drive voltage V1 generated by the power generation circuit 13 (steps ST1 and ST2).

At the time t1 in FIG. 4, the printer controller 12 outputs a voltage designation signal indicating the drive voltage V1 to the power generation circuit 13. When the voltage designation signal indicating the drive voltage V1 is input from the printer controller 12, the power generation circuit 13 sets a target value of the drawer power at the drive voltage V1 (step ST3). The printer controller 12 reads the rise time T1 corresponding to the model name MN1 of the cash drawer from the nonvolatile memory 15 to determine the preset rise time T1 that elapses before the drawer power supplied to the cash drawer 30 from the power generation circuit 13 becomes the drive voltage from an initial value (L level) (step ST4).

At the time t2 in FIG. 4, the printer controller 12 outputs a power generation signal to the power generation circuit 13 (step ST5). When the power generation signal is input from the printer controller 12 after the setting of the drive voltage V1, the power generation circuit 13 starts output of the drawer power from the output terminal. The printer controller 12 measures the rise time T1 that elapses before the drawer power becomes the drive voltage V1 (step ST6). At the time t3 in FIG. 4, that is, at the start timing of the drive period T0 when the measured time becomes the rise time T1, the printer controller 12 outputs a drawer drive signal to the drawer drive circuit 14 (step ST7). Accordingly, the preset drive voltage V1 required for the operation of the cash drawer 30 can be supplied to the cash drawer 30 in the drive period T0.

The printer controller 12 measures the drive period and stops the output of all the signals after the elapse of the drive period (steps ST8 and ST9). At the time t4 in FIG. 4, that is, at the finish timing of the drive period T0, the printer controller 12 stops the output of the voltage designation signal, the power generation signal, and the drawer drive signal. Accordingly, the level of the drawer power is the drive voltage V0 in the drive period T0 similarly to the first embodiment. Thus, it is possible to prevent the rise time T1 from overlapping the drive period T0 as in the conventional configuration.

Further, input of the drive voltage Vi and the rise time Ti from the outside of the printer 10 is not required in the another embodiment differently from the first embodiment. For example, in the first embodiment, when a user starts the driving of the cash drawer 30, the user may forget values of the drive voltage Vi and the rise time Ti and thus cannot give these values. However, in such a case, the another embodiment has the following merit. Specifically, the drive voltage Vi and the rise time Ti stored in the nonvolatile memory 15 can be read by giving the model name MNi, which enables precise start of the driving of the cash drawer 30. The same model name of the cash drawer 30 may have a plurality of drive voltages. In this case, combinations of the drive voltages Vi and the rise times Ti may be stored in the nonvolatile memory 15 corresponding to, for example, changed model names. Accordingly, the driving of the cash drawer 30 can be precisely started with the drive voltage Vi and the rise time Ti by inputting a changed model name.

The driving of the cash drawer 30 by the printer 10 has been described above in the present embodiment and the another embodiment. Specifically, in the printer 10 of each of the embodiments, the power generation circuit 13 supplies the preset drive voltage V1 required for the operation of the cash drawer 30 to the cash drawer 30. When the drawer drive signal is input, the drawer drive circuit 14 operates the cash drawer 30 with the drive voltage V1. The printer controller 12 outputs the drive signal to the drawer drive circuit 14 for the preset drive period T0 during which the drawer drive circuit 14 operates to perform the control for operating the drawer drive circuit 14.

Accordingly, in the printer 10, the power generation circuit 13 supplies the drive voltage V1 to the cash drawer 30 in the preset drive period T0 of the cash drawer 30, which eliminates a problem in which the cash drawer 30 cannot be driven. In the present invention, a power for driving the cash drawer 30 is generated and supplied only when the cash drawer 30 is driven. Thus, it is possible to provide the printer 10 having a high power efficiency.

The embodiments of the present invention have been described in detail with reference to the drawings. However, the specific configuration is not limited to the above configuration, and various modifications may be made without departing from the gist of the invention. For example, the cash drawer has been described as an example of the peripheral device. However, the present invention can also be effectively used in a peripheral device that uses a buzzer or a lamp as a constituent element of the peripheral device and notifies, for example, the completion of printing of a product name or a price. In the another embodiment, the drive period T0 is input from the host device 20. Alternatively, the drive period T0 may be previously stored in the nonvolatile memory 15, and the printer controller 12 may determine the drive period T0 during which the drawer drive signal is output.

What is claimed is:

1. A printer operably connected to an external host device and a peripheral device, the printer comprising:
   a power generation circuit programmable to generate a drive voltage at a potential level required for operation of the peripheral device;
   a drive circuit configured to activate the peripheral device with the drive voltage;
   a communication circuit configured to receive instruction signals from the external host device; and
   a control circuit programmed to:
   output a voltage designation signal to the power generation circuit in response to receipt of a start signal, that controls the power generation circuit to generate the drive voltage at the required potential level;
   output a power generation signal directing the power generation circuit to generate the drive voltage at the required potential level;
   output a drive signal directing the drive circuit to activate the peripheral device upon an expiration of a rise time of the drive voltage to rise to the required potential level, after the power generation circuit begins generating the drive voltage; and
   turn off the drive signal to deactivate the peripheral device upon expiration of a drive period.

2. The printer according to claim 1, wherein the control circuit is further programmed to receive instruction signals from the external host device that specify the required potential level and the rise time.

3. The printer according to claim 1, further comprising a nonvolatile memory, wherein the control circuit is further programmed to receive instruction signals notifying the drive period and the start instruction from the external host device through the communication circuit, and the control circuit is further programmed to read out the required potential of the drive voltage and the rise time that are pre-stored in a nonvolatile memory.

4. The printer according to claim 1, further comprising a nonvolatile memory, wherein the control circuit is further programmed to receive the start signal from the external host device through the communication circuit, and the control circuit is further programmed to read out the required potential of the drive voltage, the rise time, and the drive period that are pre-stored in the nonvolatile memory.

5. The printer according to claim 1, further comprising a nonvolatile memory, wherein the control circuit is further programmed to receive, from the external host device through the communication circuit, the start signal and other instruction signals notifying the drive period, and a model identification of the peripheral device, and the control circuit is further programmed to read out the required potential of the drive voltage and the rise time both identified by the received model identification of the peripheral device from a plurality of required potential levels of the drive voltage and a plurality of rise times that are pre-stored in the nonvolatile memory in relation to multiple models of the peripheral device.

6. The printer according to claim 1, further comprising a nonvolatile memory, wherein the control circuit is further programmed to receive, from the external host device through the communication circuit, the start signal and other instruction signals notifying a model identification of the peripheral device, and the control circuit is further programmed to read out the required potential level of the drive voltage, the rise time and the drive period identified all by the received model identification of the peripheral device from a plurality of required potential levels of the drive voltage, a plurality of rise times, and a plurality of drive periods that are pre-stored in the nonvolatile memory in relation to multiple models of the peripheral device.

7. In combination a control circuit and a printer operably connected to an external host device and a peripheral device, the combination comprising:
   the printer including:
   a power generation circuit programmable to generate a drive voltage at a potential level required for operation of the peripheral device;
   a drive circuit configured to activate the peripheral device with the drive voltage;

a communication circuit configured to receive instruction signals from the external host device; and the control circuit, wherein the control circuit is programmed to:

output a voltage designation signal to the power generation circuit in response to receipt of a start signal, that controls the power generation circuit to generate the drive voltage at the required potential level;

output a power generation signal directing the power generation circuit to generate the drive voltage at the required potential level;

output a drive signal directing the drive circuit to activate the peripheral device upon an expiration of a rise time that of the drive voltage to rise to the required potential level, after the power generation circuit begins generating drive voltage; and turn off the drive signal to deactivate the peripheral device upon expiration of a drive period.

8. The combination according to claim 7, wherein the control circuit is further programmed to determine at least one of the required potential level of the drive voltage and the rise time.

* * * * *

UNITED STATES PATENT AND TRADEMARK OFFICE
CERTIFICATE OF CORRECTION

PATENT NO. : 9,778,716 B2
APPLICATION NO. : 15/006499
DATED : October 3, 2017
INVENTOR(S) : Seiichi Jimbo Page 1 of 1

It is certified that error appears in the above-identified patent and that said Letters Patent is hereby corrected as shown below:

In the Claims

Claim 7, Column 11, Line 14, before "of the drive", please delete "that"

Claim 7, Column 11, Line 16, before "drive voltage", please insert --the--

Signed and Sealed this
Eleventh Day of June, 2019

Andrei Iancu
*Director of the United States Patent and Trademark Office*